United States Patent [19]

Sturm

[11] 4,050,610
[45] Sept. 27, 1977

[54] COIL SPRING FEEDING APPARATUS

[75] Inventor: Helmut Sturm, Kenosha, Wis.

[73] Assignee: Frank L. Wells Company, Kenosha, Wis.

[21] Appl. No.: 545,095

[22] Filed: Jan. 29, 1975

[51] Int. Cl.² .................................................. B65H 3/16
[52] U.S. Cl. ..................................... 221/171; 198/486; 198/491; 221/212
[58] Field of Search ................... 221/210, 212, 171; 198/41, 32, 486, 491

[56] References Cited

U.S. PATENT DOCUMENTS

| | | | |
|---|---|---|---|
| 2,575,220 | 11/1951 | Hiller | 198/32 |
| 3,193,136 | 7/1965 | Stumpf et al. | 221/210 X |
| 3,441,064 | 4/1969 | Fischer et al. | 221/210 X |
| 3,794,212 | 2/1974 | Check | 221/212 |

Primary Examiner—Robert B. Reeves
Assistant Examiner—Francis J. Bartuska
Attorney, Agent, or Firm—Michael, Best & Friedrich

[57] ABSTRACT

Disclosed herein is a coil spring feeding apparatus comprising a coil spring magazine supported by a frame, having a discharge end, and adapted to contain a plurality of coil springs, a chain conveyor for transporting the coil springs in the magazine toward the discharge end, a belt conveyor extending transversely of the magazine adjacent the discharge end, structure for transferring the end coil spring in the magazine to the conveyor and including a magnet adapted for magnetically attracting and releasably holding the end coil spring and movable, across the conveyor, between a retracted position on the side of the conveyor remote from the magazine discharge end and an advanced position located adjacent to the magazine discharge end in position for magnetically attracting and releasably holding the end coil spring in the magazine, a cylinder for displacing the magnet between advanced and retracted positions, and a stripper located adjacent to the conveyor along the side thereof remote from the magazine discharge end and in the path of travel of the coil spring magnetically held by the magnet during magnet movement from the advanced to the retracted positions, whereby to strip the coil spring held by the magnet when the coil spring is positioned on the conveyor.

10 Claims, 5 Drawing Figures

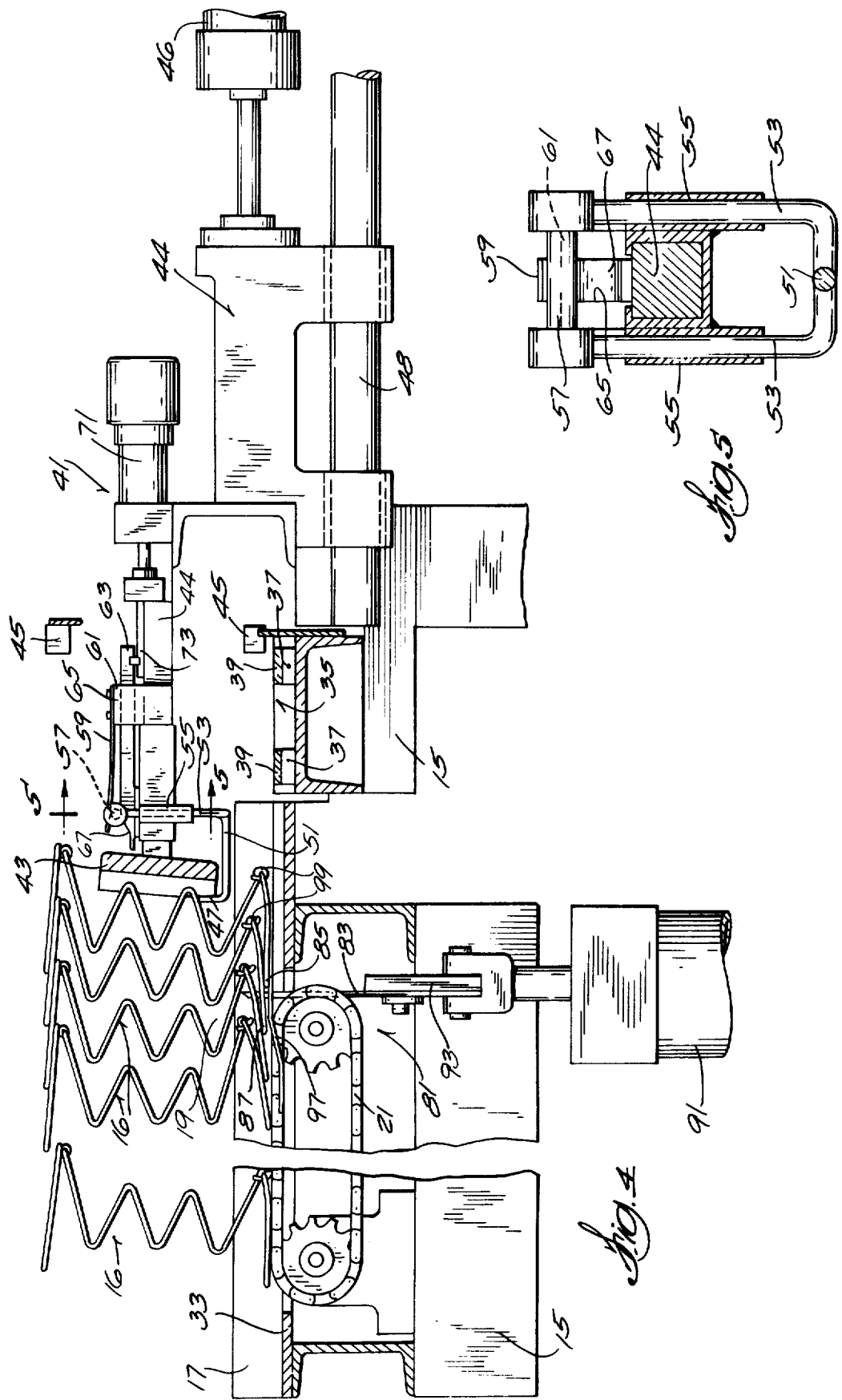

COIL SPRING FEEDING APPARATUS

BACKGROUND OF THE INVENTION

The invention relates generally to apparatus for feeding coil springs to machines for assembling such coil springs into coil spring assemblies.

One prior coil spring feeding apparatus is disclosed in my earlier U.S. Pat. No. 3,193,136 issued July 6, 1965.

A prior coil spring transfer apparatus is disclosed in my earlier U.S. Pat. No. 3,774,652, issued Nov. 27, 1973.

SUMMARY OF THE INVENTION

The invention provides a coil spring feeding apparatus comprising a coil spring magazine supported by a frame, having a discharge end, and adapted to contain a plurality of coil springs, means on the frame for conveying the coil springs in the magazine toward the discharge end, a coil spring conveyor extending transversely of the magazine adjacent the discharge end, means for transferring the end coil spring in the magazine to the conveyor and including a magnet adapted for magnetically attracting and releasably holding the end coil spring and movable across the conveyor between a retracted position on the side of the conveyor remote from the magazine discharge end and an advanced position located adjacent to the magazine discharge end in position for magnetically attracting and releasably holding the end coil spring in the magazine, and means for displacing the magnet between the advanced and retracted positions, and stripper means located adjacent to the conveyor along the side thereof remote from the magazine discharge end and in the path of travel of the coil spring magnetically held by the magnet during magnet movement from the advanced to the retracted position, whereby to strip the coil spring held by the magnet when the coil spring is positioned on the conveyor.

In accordance with an embodiment of the invention, the apparatus further includes means operably when the magnet is adjacent to the advanced position for restraining movement in the direction toward the magazine discharge end of the coil spring next to the end coil spring.

Also in accordance with an embodiment of the invention, the next coil spring movement restraining means comprises a member movable through the magazine floor between a projecting position above the floor and a withdrawn position below the floor, and means for displacing the member to the projecting position when the magnet is adjacent to the advanced position and for retracting the member to the withdrawn position after separation of the end coil spring from the next coil spring in response to travel of the end coil spring out of the magazine discharge end during retention of the end coil spring on the magnet while the magnet moves from the advanced position.

In accordance with an embodiment of the invention, the apparatus further includes a retainer finger movable between a retaining position engagable with the inside surface of the end coil spring and a non-retaining position permitting movement into and out of the interior of the end coil spring between the convolutions thereof, and means for displacing the finger transversely of the conveyor in common with the magnet and for displacing the finger between the retaining and non-retaining positions in response to movement of the magnet between the advanced and retarded positions.

In accordance with an embodiment of the invention, the means for displacing the finger between the retaining and non-retaining positions includes means biasing the finger toward the non-retaining position, and cam means movable and in response to magnet movement for displacing the finger to the retaining position against the action of the biasing means after initial engagement of the end coil spring by the magnet and for permitting movement of the finger to the non-retaining position in response to the action of the biasing means after the end coil spring is removed from the magazine discharge end and prior to engagement of the end coil spring with the stripper means.

One principal feature of the invention is the provision of a coil feeding apparatus employing magnetic means for transfering coils from a magazine to a transversely extending conveyor.

Another of the principal features of the invention is the provision of a coil spring feeding apparatus which will provide reliable service over a long and useful life.

Other features and advantages of the invention will become known by reference to the following drawings, general description, and claims.

IN THE DRAWINGS

FIG. 4 is an enlarged, fragmentary side view, partially broken away and in section, of a portion of the coil spring feeding apparatus shown in FIG. 1.

FIG. 5 is a fragmentary sectional view taken generally along line 5—5 of FIG. 4.

Figure 1:
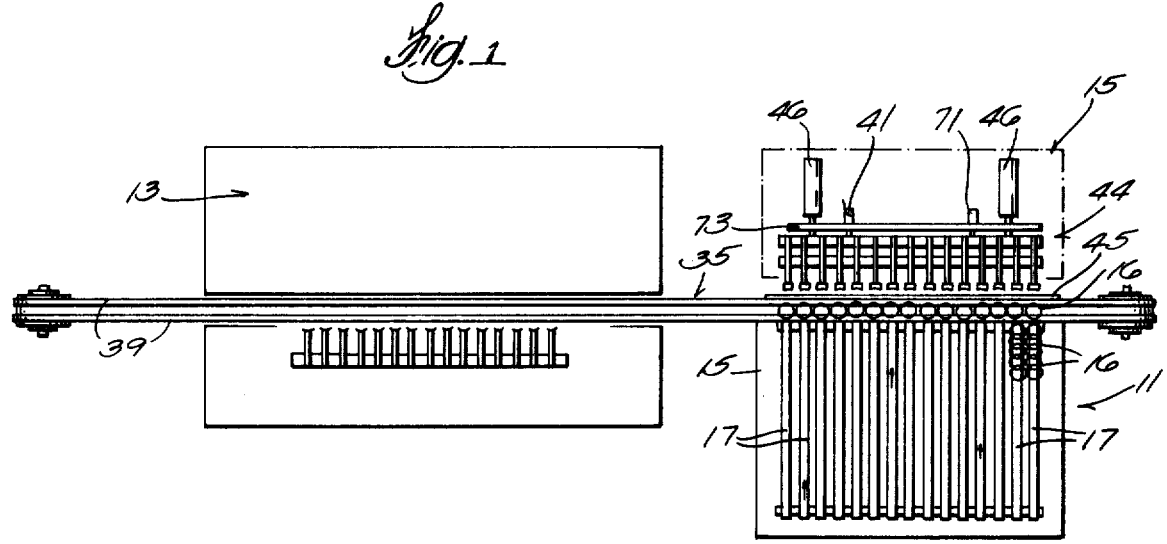
FIG. 1 is a schematic view of an intergrated machine assembly including a coil spring assembly machine, a coil spring transfer conveyor, and a coil spring feeding apparatus which embodies various of the features of the invention.
Figure 3:
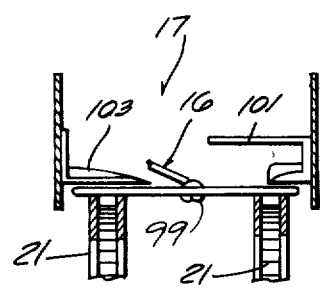
FIG. 3 is a fragmentary sectional view taken generally along line 3—3 of FIG. 2.

Before explaining the illustrated coil spring feeding apparatus in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for purpose of description and should not be regarded as limiting.

GENERAL DESCRIPTION

Illustrated schematically in FIG. 1 is a coil spring feeding apparatus 11 for a coil spring assembly machine 13 adapted to unite a plurality of individual coil springs into a coil spring assembly for use, as for instance, in a mattress.

Figure 2:
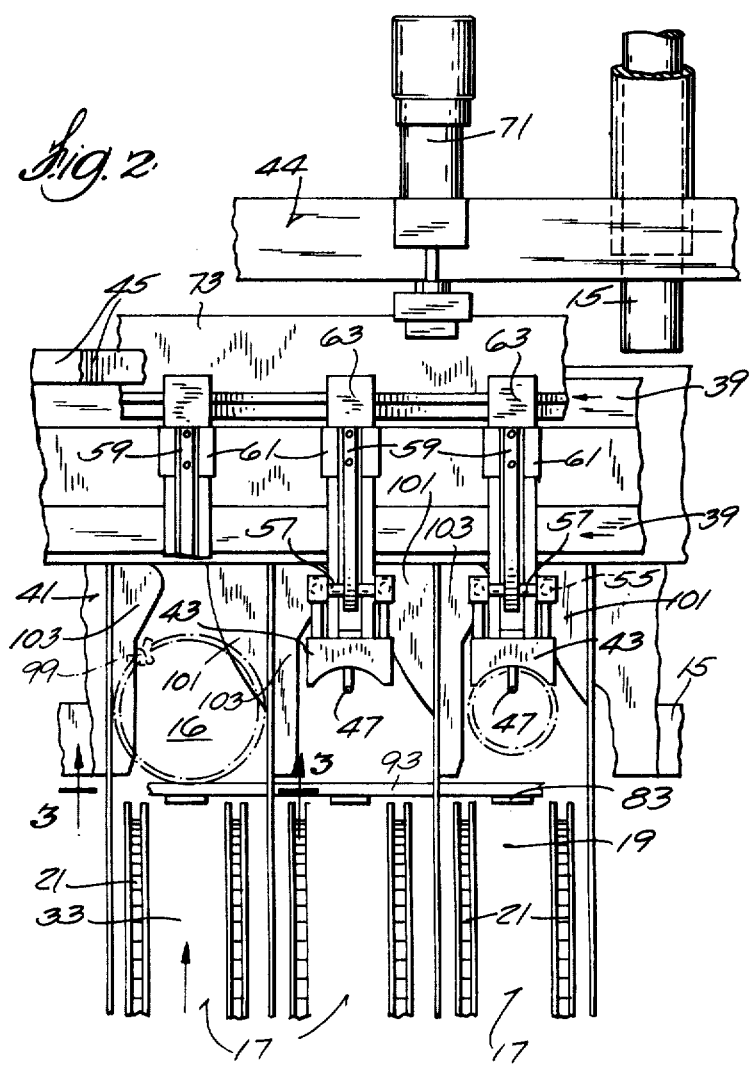
FIG. 2 is an enlarged, fragmentary top view, partially broken away, of a portion of the coil spring feeding apparatus shown in FIG. 1.

More particularly, the coil spring feeding apparatus 11 includes, as shown in FIGS. 2 and 4, a supporting machine frame 15, a plurality of coil spring magazines 17 extending in generally adjacent and parallel relation to each other and each having means for transporting coil springs 16 from a magazine outer end to a magazine discharge end 19. Such coil spring transporting means can take various forms and, in the illustrated construction, comprises a chain conveyor 21 constructed in a known manner and movable along the magazine floor 33. If desired, the magazines 17 can be spaced apart at the same spacing as the coil springs 16 in the finished coil spring assembly. Each of the chain conveyors 21 is preferably driven by a common drive mechanism (not shown).

Extending adjacent to the magazine discharge end 19 and supported by the machine frame 15 is a coil spring conveyor 35 which is adapted to receive coil springs 16 from the magazines 17 and transport the coil springs 16 to the coil spring assembly machine 13. While various constructional arrangements can be employed, in the illustrated construction, the conveyor comprises a rigid bed including two spaced and magnetized bars 37 which are supported by the frame 15 in transverse relation to the discharge end 19 of the magazine 17, together with a pair of endless belts 39 which are respectively disposed over the bars 37 and which are periodically driven by suitable drive means (not shown).

Supported by the machine frame 15 adjacent the side of the conveyor 35 remote from the magazine discharge end 19 is a coil spring transfer mechanism 41 operative to grasp the end coil springs 16 at the magazine discharge ends, to transport the end coil springs 16 out of the magazines 17 and transversely of the conveyor 35 and to strip the end coil springs 16 from the transfer mechanism 41 when the coil springs 16 are located in desired position on the conveyor 35. In this regard, the transfer mechanism 41 is identical at each magazine.

At each magazine 17, the transfer mechanism 41 includes a magnet 43 which is adapted for magnetically attracting and releasably holding the end coil spring 16 and which is carried by a supporting frame 44 for movement with the frame 44 across the conveyor 35 between a retracted position on the side of the conveyor 35 remote from the magazine discharge end 19 and an advanced position located adjacent to the magazine discharge end 19 in position for magnetically attracting and releasably holding the end coil spring 16 in the magazine 17.

The transfer frame 44 is mounted on suitable guides 48 on the machine frame 15 for movement beteeen the advanced and retracted positions and is displaceable between the advanced and retracted positions by suitable means which, in the illustrated construction, comprises one or more fluid cylinders 45 which, perferably, are two-way cylinders.

The transfer mechanism 41 also includes means for stripping the coil springs 16 from the magnets 43 when the coil springs are properly located on the conveyor 35. While various arrangements can be employed in the illustrated construction, such means comprises upper and lower stripper bars 45 fixedly supported by the frame 15 and located on the side of the conveyor 35 remote from the magazine discharge ends 19 so as to engage the upper and lower coils of the coil spring 15 and prevent further holding of the coil springs 16 as the magnets 43 travel to their retracted position.

Also included in the transfer mechanism 41 is a coil spring retainer means which functions to assure retention of the coil springs 16 by the magnets 43 during extraction from the magazines 17 of the end coil springs 16. While other arrangements can be employed, in the illustrated construction, such means comprises, for each magnet 43, a retainer finger 47 which is movable between a retaining position engagable with the inside surface of the end coil spring 16 and a non-retaining position permitting movement into and out of the interior of the end coil spring 16 between the convolutions thereof.

While various finger constructions can be employed, in the illustrated construction, the finger 47 extends vertically and forms a part of a generally U-shaped arm which also includes a generally horizontally extending arm portion 51 extending from the finger 47, and a horizontally spaced pair of generally parallel, vertically extending supporting arm portions 53 extending from the horizontal arm portion 51.

Means are provided for mounting the fingers 47 from the transfer frame 44 for common movement with the magnet 43 across the conveyor 35 and for vertical movement between the coil spring retaining position and the non-retaining position. While various arrangements can be employed, in the illustrated construction, the vertically extending supporting arm portions 53 are movably mounted in guides 55 fixed to a part of the transfer frame 44.

Means are provided for displacing the fingers 47 between the coil spring retaining and non-retaining positions. While various arrangements can be employed in the illustrated construction, such means comprises, for each magnet 43, biasing means urging the finger 47 toward the non-retaining position, together with cam means acting against the biasing means for displacing the finger 47 to the coil spring retaining position in response to movement of the transfer frame 44. Thus, in the illustrated construction, at their upper ends, the vertical extending arm portions 53 are interconnected by a cross rod 57 biased downwardly by a leaf spring 59 which engages the upper surface of the rod 57 and which is fixed to a bridge structure 61 forming a part of the transfer frame 44.

While other arrangements could be employed, the cam means comprises a cam element 63 which is movable between two spaced positions relative to the cross rod 57 and beneath the bridge structure 61, in a suitable guideway 65 on the transfer frame 44. The cam element 63 includes a cam surface 67 engaging the under surface of the cross rod 57 to force the cross rod 57 upwardly against the action of the leaf spring 59 to located the finger 47 in the coil spring retaining position when the cam element 63 is in one of the positions, and to permit finger movement under the action of the leaf spring 59 to the non-retaining position when the cam element is in the other position.

Means are also provided for shifting the cam element 63 relative to its positions in response to movement of the transfer frame 44. While other arrangements could be employed, in the illustrated construction, such means comprises one or more fluid cylinders 71 which can be one-way spring return cylinders or can be two-way cylinders and which, through suitable controls, are actuated in response to transfer frame movement, so as to cause finger movement to the coil spring retaining position when the transfer frame is at or adjacent to the advance position and for causing finger movement to the non-retaining position after extraction of the end coil spring 16 from the magazine discharge end 19 and prior to engagement of the end coil spring with the stripper means still to be described.

In the illustrated construction, the fluid cylinders 71 are connected to a cross bar 73 which, in turn, is connected to the cam elements 63 to effect common movement thereof.

Each magazine 17 is preferably provided with a coil spring retaining mechanism 81 which functions to permit withdrawl from the magazine discharge end 19 of the end coil spring 16 while, at the same time, preventing withdrawal from the magazine discharge end 19, of the coil spring next to the end coil spring during extraction of the end coil spring. While other arrangements can be employed, in the illustrated construction, such means comprises, for each magazine, a discriminator or retainer blade or member 83 which is movable through the magazine floor 33 between a withdrawn position below the magazine floor 33 and a projecting position above the magazine floor 33 rearwardly of the rearward part of the bottom coil 85 of the end coil spring and forwardly of the rearward part of the bottom coil 87 of the coil spring next to the end coil spring.

Means are provided for displacing the discriminator blades 83 between the projecting and withdrawn positions comprising one or more fluid cylinders 91 which can be either one-way spring return cylinders or two-way cylinders, which cylinders 91 are connected to a cross bar 93 connected to all of the discriminator blades 83 so as to provide common movement thereof. Suitable means (not shown) are provided on the machine frame 15 for guiding movement of the cross bar 43 and the retainer blades 83. Suitable control means (not shown) are also provided on the machine frame and actuated by the transfer frame movement to effect discriminator blade movement to the projecting position when the transfer frame 44 is in or adjacent to the advanced position and to effect discriminator blade movement to the withdrawn position extraction of the end coil spring 16 from the magazine discharge end 19.

Preferably, movement of the magnet 43 is employed, in cooperation with the magazine floor 33, to properly locate the end coil spring and the next coil spring prior to discriminator blade movement to the projecting position. In this regard, each of the magazine floors 33 includes, adjacent to the discharge end 19 thereof, an upwardly inclined ramp 97 which serves generally to discourage further forward movement of the coil springs 16 by the chain conveyor 21 when the rearward part of the bottom coil 85 of the end coil spring is located slightly forwardly of the discriminator blade 83. However, the movement of the transfer frame 44 is arranged so that the magnet 43 engages the end coil spring stopped by the ramp 97 prior to reaching the advanced position. Accordingly, full magnet movement to the advanced position serves to displace the end coil spring and adjacent coil springs rearwardly of the magazine 17 so as to locate the end coil spring and the next to the end coil spring for insertion therebetween of the discriminator blade 83.

Means are also provided for retaining the bottom coil of the coil spring 16 on the magazine floor 33 during coil spring extraction or withdrawal from the magazine discharge end 19, and for causing such rotation of the coil spring as may be necessary to locate the coil spring knot 99 in proper position as the coil spring 16 is extracted or withdrawn from the magazine discharge end 19. While other arrangements can be employed, in the illustrated construction, such means comprises right and left side combined guide and cam elements 101 and 103, respectively.

In operation, coil springs 16 are initially located in the magazines 17 and, consequent to operation of the chain conveyors 21, are carried forward in the magazines 17 until further forward movement is discouraged by the upwardly inclined ramps 97 adjacent to the magazine discharge end 19. Movement of the transfer frame 44 toward the advanced position engages the magnets with the end coil springs 16 in the associated magazines 17 and dispaces the end coil springs 16 rearwardly a small amount so as to properly locate the end coil springs and the next to the end coil springs for insertion therebetween of the discriminator blades 83 which retain the next to the end coil springs in the magazines 17 during extraction or withdrawal of the end coil springs.

When the end coil springs are engaged by the magnets 43, the retention fingers travel between the convolutions of the end coil springs 16 and, at approximately the time when the magnets 43 reach the advanced position, the retainer fingers 47 are displaced to the coil spring retaining positions, assuring retention of the end coil springs on the magnets 43 during extraction of the end coil springs 16 from the magazine discharge end 19. Thereafter, the transfer frame 44 is moved from the advanced to the retracted position, carrying the end coil springs 16 out of the magazine 17 while at the same time, permitting angular movement of the end coil springs 16 relative to the magnets 43 in response to engagement of the bottom coils of the end coil springs 16 with the combined guide and camming blades 101 and 103 at the magazine discharge ends 19. Thus, the end coil springs 16 are extracted with the knots 99 in aligned proper position.

After withdrawal of the end coil springs 16 from the magazines 17, the discriminator blades 83 are moved to their withdrawn positions and, prior to engagement of the end coil springs 16 with the stripper bars 45, the retention fingers 47 are displaced to their non-retaining positions. After displacement of the retainer fingers 47 to their non-retaining positions, the magnets 43 provide the sole holding means as the end coil springs 16 move across the conveyor 35 toward the stripper bars 45, whereby, incident to engagement with the stripper bars 45, the end coil springs 16 are stripped from the magnets 43 and deposited on the conveyor 35. After stripping of the coil springs 16 from the magnets 43, the conveyor 35 is actuated to transport the coil springs 16 to the spring assembly machine and thereafter the transfer frame 44 is again actuated for movement of the magnets 43 to the advanced position for extracting another group of coil springs 16.

Various of the features of the invention are set forth in the following claims.

What is claimed is:

1. Coil spring feeding apparatus comprising a frame, a coil spring magazine supported by said frame, having a discharge end, and adapted to contain a plurality of coil springs, means on said frame for conveying the coil springs in said magazine toward said discharge end, a coil spring conveyor extending transversely of said magazine adjacent said discharge end, means for withdrawing the end coil spring from said magazine and for transporting the withdrawn end coil spring from said magazine onto said conveyor and including a magnet adapted for magnetically attracting and releasably holding the end coil spring and movable across said conveyor between a retracted position on the side of said conveyor remote from said magazine discharge end and an advanced position located adjacent to said magazine discharge end in position for magnetically attracting and releasably holding the end coil spring in said magazine, means for displacing said magnet between said advanced and retracted positions to withdraw the end coil spring from said magazine and to transport the end coil spring onto said conveyor, stripper means located adjacent to said conveyor along the side thereof remote from said magazine discharge end and in the path of travel of the coil spring magnetically held by said magnet during movement of said magnet from said advanced to said retracted positions, whereby to strip the coil spring held by said magnet when the coil spring is positioned on said conveyor, a retainer finger movable between a retaining position engagable with the inside surface of the end coil spring and a non-retaining position permitting movement into and out of the interior of the end coil spring between the convolutions thereof, and means for displacing said finger transversely of said conveyor in common with said magnet and for displacing said finger between said retaining and non-retaining positions.

2. Apparatus in accordance with claim 1 wherein said magazine includes means operable when said magnet is adjacent to said advanced position for restraining movement in the direction toward said magazine discharge end of the coil spring next to the end coil spring.

3. Apparatus in accordance with claim 2 wherein said magazine includes a floor and the next coil spring movement restraining means comprises a member movable through said floor between a projecting position above said floor and a withdrawn position below said floor, and means for displacing said member to said projecting position when said magnet is adjacent to said advanced position and for retracting said member to said withdrawn position after separation of the end coil spring from the next coil spring during retention of the end coil spring on said magnet while said magnet moves from said advanced position.

4. Apparatus in accordance with claim 1 wherein said means for displacing said finger between said retaining and non-retaining positions includes means biasing said finger toward said non-retaining position, and cam means movable in response to magnet movement for displacing said finger to said retaining position against the action of said biasing means after initial engagement of the end coil spring by said magnet and for permitting movement of said finger to said non-retaining position in response to the action of said biasing means after the end coil spring is removed from said magazine discharge end and prior to engagement of the end coil spring with said stripper means.

5. Apparatus in accordance with claim 1 wherein said magazine further includes means for orientating the end coil spring knot in response to travel of the end coil spring out of said magazine.

6. Coil spring feeding apparatus comprising a frame, a coil spring magazine supported by said frame, having a discharge end, and adapted to contain a plurality of coil springs, means on said frame for conveying the coil springs in said magazine toward said discharge end, a coil spring conveyor extending transversely of said magazine adjacent said discharge end, means for withdrawing the end coil spring from said magazine and for transporting the withdrawn end coil spring from said magazine onto said conveyor and including a magnet adapted for magnetically attracting and releasably holding the end coil spring and movable across said conveyor between a retracted position on the side of said conveyor remote from said magazine discharge end and an advanced position located adjacent to said magazine discharge end in position for magnetically attracting and releasably holding the end coil spring in said magazine, means for displacing said magnet between said advanced and retracted positions to withdraw the end coil spring from said magazine and to transport the end coil spring onto said conveyor, stripper means located adjacent to said conveyor along the side thereof remote from said magazine discharge end and in the path of travel of the coil spring magnetically held by said magnet during movement of said magnet from said advanced to said retracted positions, whereby to strip the coil spring held by said magnet when the coil spring is positioned on said conveyor, a retainer finger carried by said coil withdrawing and transporting means movable between a retaining position engageable with the inside surface of the end coil spring and a non-retaining position permitting movement into and out of the interior of the end coil spring between the convolutions thereof, and means for displacing said finger transversely of said conveyor in common with said magnet, for displacing said finger to said retaining position after initial engagement of said end coil spring by said magnet, and for displacing said finger to said non-retaining position after the end coil spring is withdrawn from said magazine and prior to engagement of the end coil spring with said stripper means.

7. Apparatus in accordance with claim 6 wherein said magazine includes means operable when said magnet is adjacent to said advanced position for restraining movement in the direction toward said magazine discharge end of the coil spring next to the end coil spring.

8. Apparatus in accordance with claim 7 wherein said magazine includes a floor and the next coil spring movement restraining means comprises a member movable through said floor between a projecting position above said floor and a withdrawn position below said floor, and means for displacing said member to said projecting position when said magnet is adjacent to said advanced position and for retracting said member to said withdrawn position after separation of the end coil spring from the next coil spring during retention of the end coil spring on said magnet while said magnet moves from said advanced position.

9. Apparatus in accordance with claim 6 wherein said means for displacing said finger between said retaining and non-retaining positions includes means biasing said finger toward said non-retaining position, and cam means movable in response to magnet movement for displacing said finger to said retaining position against the action of said biasing means after initial engagement of the end coil spring by said magnet and for permitting movement of said finger to said non-retaining position in response to the action of said biasing means after the end coil spring is removed from said magazine discharge end and prior to engagement of the end coil spring with said stripper means.

10. Apparatus in accordance with claim 6 wherein said magazine further includes means for orientating the end coil spring knot in response to travel of the end coil spring out of said magazine.

* * * * *